United States Patent [19]

Sakai et al.

[11] Patent Number: 5,867,638
[45] Date of Patent: Feb. 2, 1999

[54] INFORMATION PROCESSING SYSTEM

[75] Inventors: Masanori Sakai; Yoshinobu Aiba, both of Yokohama; Hiroshi Ozaki, Tokyo; Masahiro Iwadate, Yokohama, all of Japan

[73] Assignee: Canon Kabushiki Kaisha, Tokyo, Japan

[21] Appl. No.: 62,557

[22] Filed: May 18, 1993

[30] Foreign Application Priority Data

May 18, 1992 [JP] Japan ..................................... 4-125138

[51] Int. Cl.⁶ ....................................................... H04N 1/21
[52] U.S. Cl. .......................... 395/114; 358/468; 345/517
[58] Field of Search .................................... 358/426, 404, 358/444, 433, 406, 442, 468; 364/228.1, 238; 395/164, 165, 166, 114; 345/515–517

[56] References Cited

U.S. PATENT DOCUMENTS

| 3,999,163 | 12/1976 | Levy et al. ................................ 364/238 |
| 4,410,916 | 10/1983 | Pratt et al. ............................... 358/433 |
| 4,493,030 | 1/1985 | Barratt et al. ......................... 364/228.1 |
| 4,494,232 | 1/1985 | Dambrackas et al. ..................... 370/80 |
| 4,561,053 | 12/1985 | Crawford ................................ 364/200 |
| 4,589,106 | 5/1986 | Prather et al. .......................... 370/58.2 |
| 4,615,017 | 9/1986 | Finlay et al. ............................. 364/900 |
| 4,639,861 | 1/1987 | Appiano et al. ...................... 364/228.1 |
| 4,891,768 | 1/1990 | Willems et al. .......................... 395/164 |
| 5,142,672 | 8/1992 | Johnson et al. .......................... 395/500 |
| 5,175,820 | 12/1992 | Gephardt ................................. 395/275 |
| 5,187,779 | 2/1993 | Jeddeloh et al. ........................ 395/325 |
| 5,191,657 | 3/1993 | Ludwig et al. .......................... 364/231 |
| 5,247,643 | 9/1993 | Shottan .................................... 395/425 |
| 5,265,216 | 11/1993 | Murphy et al. .......................... 364/239 |
| 5,412,488 | 5/1995 | Ogata . |

FOREIGN PATENT DOCUMENTS 0260392 3/1988 European Pat. Off. .
0400543 12/1989 European Pat. Off. .

Primary Examiner—Kim Yen Vu
Attorney, Agent, or Firm—Fitzpatrick, Cella, Harper & Scinto

[57] ABSTRACT

An information processing system comprises a core, and a sub-unit (for example, a facsimile unit, a file unit, and a computer interface unit, a formater or an image memory) connected to the core, and the core and the sub-unit are connected by two types of buses, synchronous type and asynchronous type. Where the data transfer between the core and the sub-unit is to be effected through the asynchronous bus, the core may simultaneously transfer data to another sub-unit by using the synchronous bus. Where the data transfer between the core and the sub-unit is to be effected by the synchronous bus, the data may be parallelly transferred to a plurality of sub-units.

42 Claims, 9 Drawing Sheets

INFORMATION PROCESSING SYSTEM

BACKGROUND OF THE INVENTION

1. Field of the Invention

The present invention relates to an information processing system having a main unit, at least one sub-unit controlled by the main unit and a data bus interconnecting at least one sub-unit and the main unit, and more particularly to an information processing system which permits transfer of data in an efficient manner in a system comprising a plurality of units having a number of functions.

2. Related Background Art

In a prior art multi-function system having a plurality of functional blocks, speed-up of data transfer to and from a controller which controls the blocks is done mainly by improving the processing speed of the controller, that is, improving the performance of the built-in CPU.

However, the provision of a high performance CPU to increase the processing speed of the controller leads to an increase in the cost and complexity of the apparatus and also to an increase in power consumption, and hence it cannot be readily adopted.

SUMMARY OF THE INVENTION

It is an object of the present invention to provide an information processing system which eliminates the above problems.

It is another object of the present invention to provide an information processing system which permits efficient data transfer between a main unit and a sub-unit.

It is still another object of the present invention to provide an information processing system which permits data transfer by a synchronous bus and an asynchronous bus between a main unit and a sub-unit.

Other objects of the present invention will be apparent from the following detailed description of the invention and the drawings.

DETAILED DESCRIPTION OF THE PREFERRED EMBODIMENTS

One embodiment of the present invention is now explained with reference to the accompanying drawings.

Figure 1:
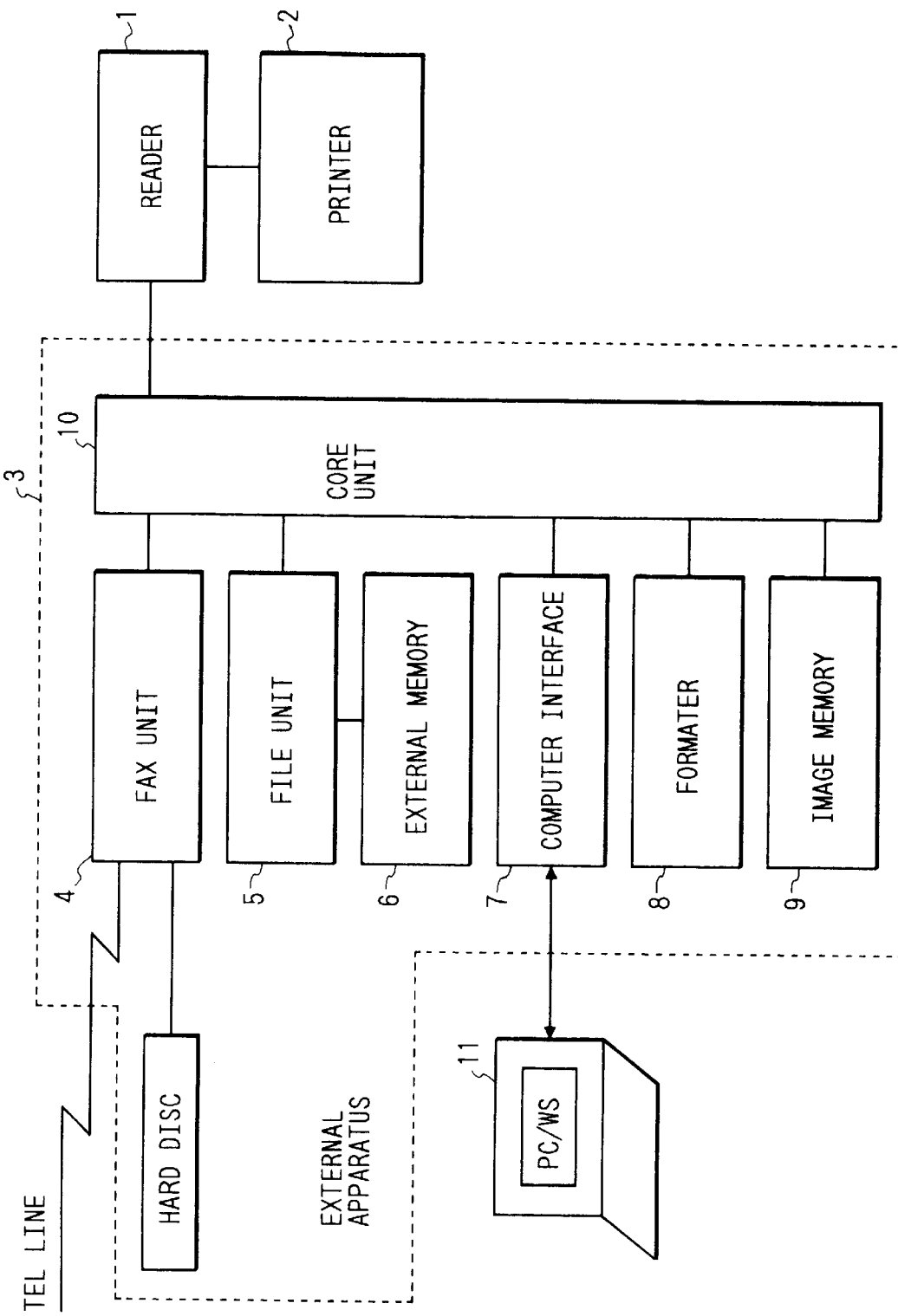
FIG. 1 shows a block diagram of an overall configuration of one embodiment of the present invention.

FIG. 1 shows a block diagram of a configuration of one embodiment of the present invention.

In FIG. 1, numeral 1 denotes an image input device (hereinafter referred to as a reader) for converting a document sheet to image data, numeral 2 denotes an image output device (hereinafter referred to as a printer) having record sheet cassettes of a plurality of types for outputting the image data as a visual image onto a record sheet transported from the record sheet cassette by a print command, numeral 3 denotes an external apparatus having various functions and electrically connected to the reader 1, and numeral 11 denotes a computer such as a personal computer or a workstation.

The external device comprises a facsimile unit 4 having a facsimile communication function, a file unit 5 for converting various document sheet information to electrical signals and storing them, an external memory 6 connected to the file unit 5, a computer interface unit 7 for connecting with the computer 11, a formater 8 for developing code information from the computer to image information, an image memory 9 for storing information from the reader 1 and temporarily storing information sent from the computer, and a core 11 for controlling the above functions.

Operation of the present invention is now explained.

Figure 2:
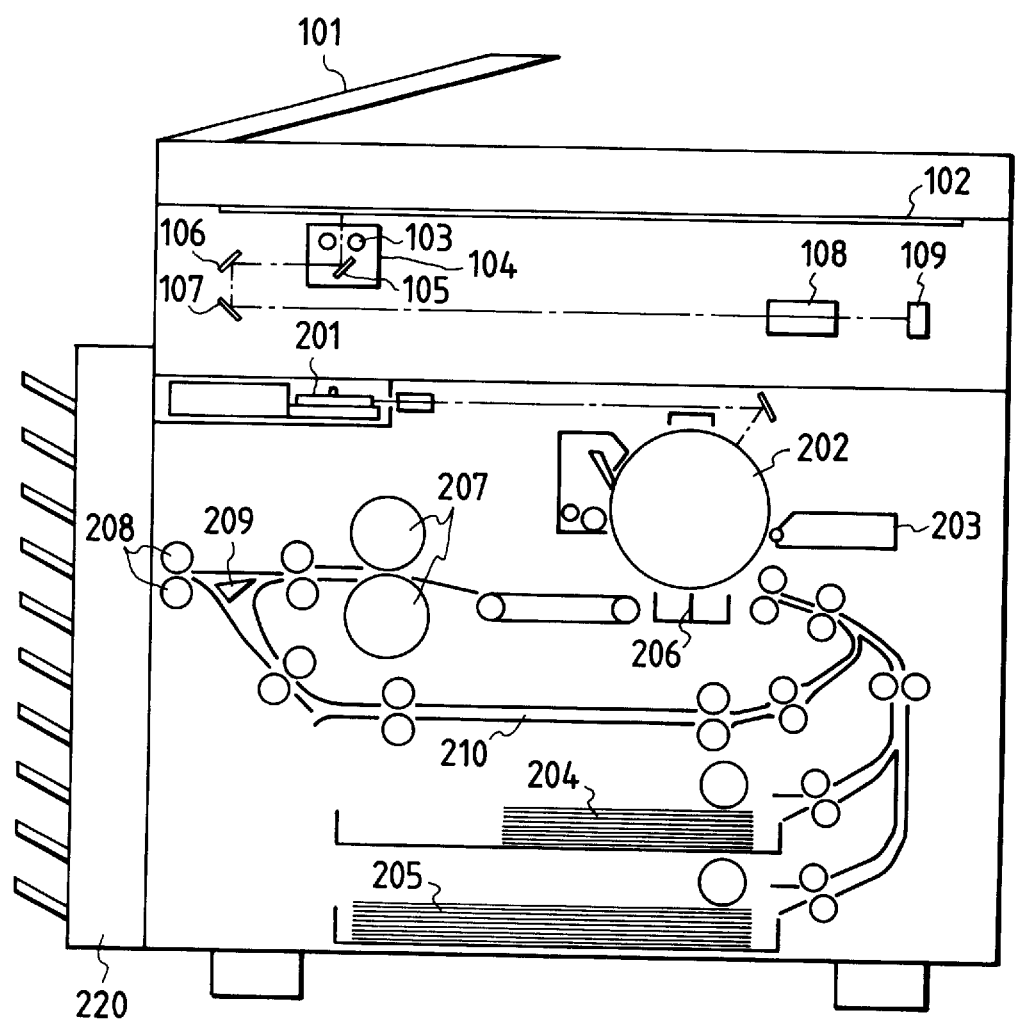
FIG. 2 shows a schematic view of a reader and a printer shown in FIG. 1.

In FIG. 2, numeral 101 denotes a document sheet feeder, numeral 102 denotes a document sheet table glass, numeral 103 denotes a scanner, numeral 104 denotes a scanner unit, numerals 105–107 denote mirrors, numeral 108 denotes a lens and numeral 109 denotes a CCD image sensor (hereinafter referred to as CCD). Those units form a mechanical part of the reader.

Numeral 201 denotes an exposure control unit, numeral 202 denotes a photo-conductive drum, numerals 204 and 205 denote record sheet stackers, numeral 206 denotes a transfer unit, numeral 207 denotes a fixing unit, numeral 207 denotes a sheet ejection unit, numeral 209 denotes a transport direction switching member, numeral 210 denotes a refeed record sheet stacker and numeral 220 denotes a sorter. Those units form a mechanical part of the printer 2.

[Reader 1]

Figure 3:
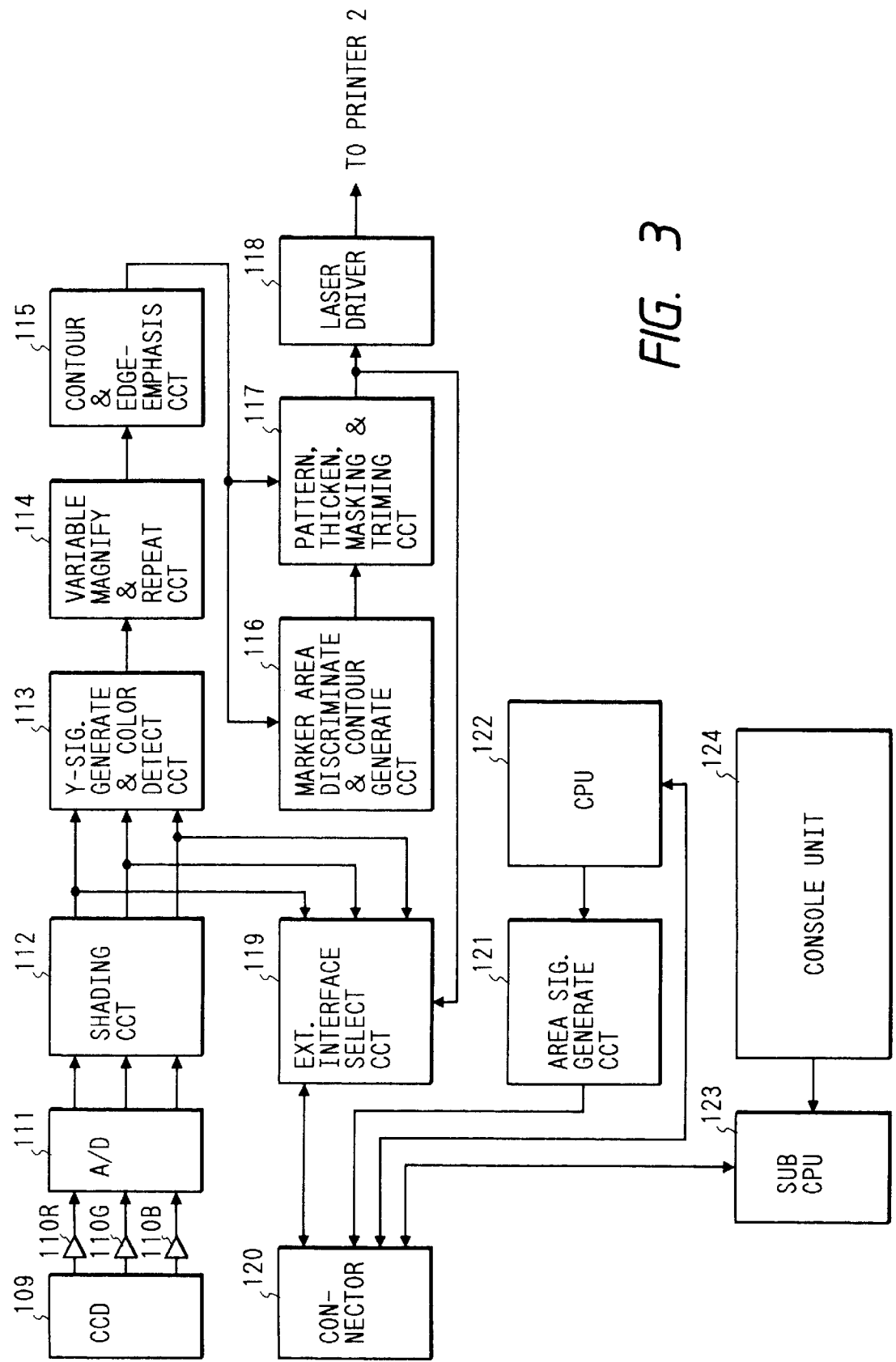
FIG. 3 shows a block diagram of a detailed configuration of an image processing unit in the reader.

Referring to FIG. 3, a detailed configuration of the reader 1 is now explained.

In the reader 1, document sheets mounted on the document sheet feeder 101 are sequentially fed to the document sheet table glass 102 one by one. When the document sheet is fed, a lamp of the scanner 103 is lit and the scanner unit 104 is moved to illuminate the document sheet. A reflected light from the document sheet passes through the mirrors 105, 106 and 107 and the lens 108 and then it is directed to the CCD image sensor (hereinafter referred to as CCD) 109.

Referring to FIG. 3, the image processing in the reader is explained.

The image information inputted to the CCD 109 is photo-electrically converted to an electrical signal. A color signal from the CCD 109 is amplified by amplifiers 110R, 110G and 110B in accordance with an input signal level of an A/D converter 111. It is then applied to the A/D converter 111 and converted to a corresponding digital signal.

An output signal from the A/D converter 111 is applied to a shading circuit 112 where unevenness of light projection of a lamp 103 and unevenness of sensitivity of the CCD are corrected. A signal from the shading circuit 112 is applied to a Y signal generation/color detection circuit 113 and an external I/F switching circuit 119.

The Y signal generation/color detection circuit 113 processes the signal from the shading circuit 112 in accordance with the following formula to produce a Y signals:

$$Y=0.3R+0.6G+0.1B$$

The Y signal generation/color detection circuit 113 further includes a color detection circuit which separates the R, G and B signals into seven colors and produces output signals for the respective colors.

Output signals from the Y signal generation/color detection circuit 113 are applied to a variable magnification/repeat circuit 114. In the present embodiment, the magnification in a sub-scan direction is changed by controlling the scan speed of the scanner unit 104, and the magnification in the main scan direction is changed by the variable magnification/repeat circuit 114. A plurality of identical images may be outputted by the variable magnification/repeat circuit 114.

A contour/edge emphasis circuit 115 emphasizes a high frequency component of the signal from the variable magnification/repeat circuit 114 to produce edge emphasis and contour information. The signal from the contour/edge emphasis circuit 115 is applied to a marker area discrimination/contour generation circuit 116 and a patterning/thickening/masking/trimming circuit 117. The marker area discrimination/contour generation circuit 116 reads an area marked by a marker pen of a designated color on the document sheet to generate marker contour information and send it to the patterning/thickening/masking/trimming circuit 117.

The patterning/thickening/masking/trimming circuit 117 thickens, masks and trims the image based on the contour information. It also patterns the image based on the color detection signal from the Y signal generation/color detection circuit 113. The output signal from the patterning/thickening/masking/trimming circuit 117 is applied to a laser driver 118 where it is converted to a signal for driving the laser. The signal of the laser driver is sent to the printer 2 to control the light emission of the laser of an exposure control unit 201 to generate a visual image.

The external I/F switching circuit 119 which interfaces with the external device is now explained.

When the image signal is outputted from the reader 1 to the external device 3, the external I/F switching circuit 119 supplies the image information from the patterning/thickening/masking/trimming circuit 117 to a connector 120. When the reader 1 receives the image information from the external device 3, the external I/F switching circuit 119 supplies the image signal from the connector 120 to the Y signal generation/color detection circuit 113.

The above image processing is done by the command of the CPU 122. The area generation circuit 121 generates various timing signals necessary for the image processing in accordance with the setting of the CPU 122. Further, it communicates with the external device 3 by using a communication function built in the CPU 122. SUBCPU 123 controls a console unit 124 and communicates with the external device 3 by using a communication function built in the SUBCPU 123.

[Printer 2]

The signal applied to the printer 2 is converted to a light signal by the exposure control unit 201 and it is irradiated to a photo-conductor 202 in accordance with the image signal. A latent image formed by the irradiated light on the photo-conductor 202 is developed by a developing unit 203. In synchronism with the development, a record sheet is transported from the record sheet stacker 204 or the record sheet stacker 205 and the developed image is transferred in the transfer unit 206.

The transferred image is fixed by the fixing unit 207 and ejected out of the apparatus by the sheet ejection unit. 208. The record sheet ejected from the sheet ejection unit 208 is supplied to a bin when a sorting function of the sorter 220 is operating, or to the top level bin of the sorter when the sort function is not operating.

A method for outputting the sequentially read image to both sides of one output form is now explained. The output form fixed by the fixing unit 207 is transported to the sheet ejection unit 208 and the direction of the output form is reversed and transported to the refeed sheet stacker 210 through the transport direction switching member 209. When the next document sheet is ready, the document sheet image is read in the same manner as that of the above process but the record sheet is transported from the refeed record sheet stacker 210. Thus, two document sheet images are outputted on the front and rear sides of one output form.

[External Device 3]

Functions of respective units are explained below.

[Core 10]

Figure 4:
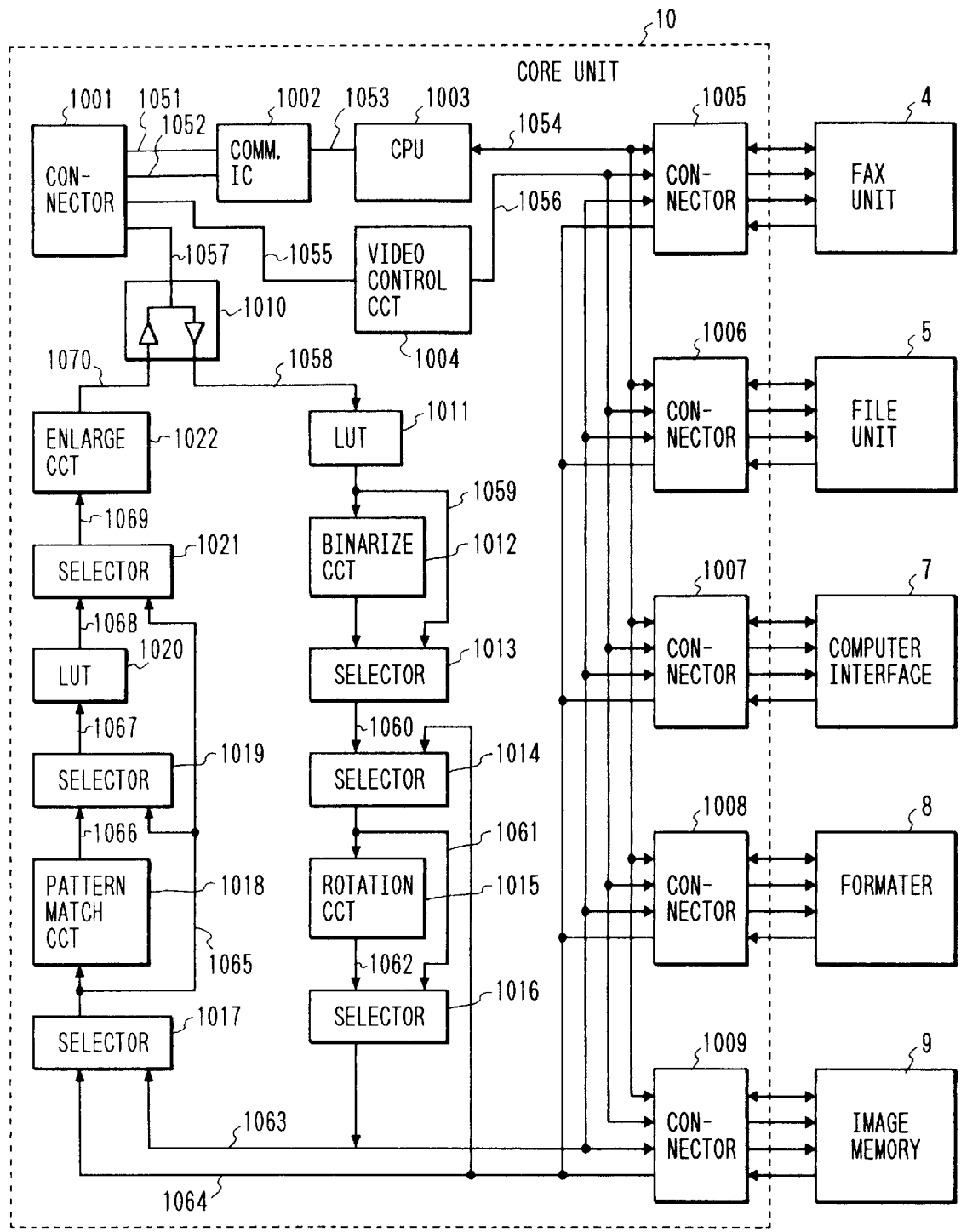
FIG. 4 shows a block diagram of a detailed description of a core shown in FIG. 1.

A detailed configuration of the core is shown in FIG. 4. In FIG. 4, a connector 1001 of the core 10 is connected to the connector 120 of the reader 1 through a cable. Four signals are supplied to the connector 1001. Numerals 1051 and 1052 denote communication control lines of the CPU 1003 which are signal lines to transfer communication information processed by a communication IC 1002 to the CPU 1003 through a CPU bus 1053. Numeral 1055 denotes a control signal for controlling a video signal and numeral 1057 denotes an 8-bit multi-level bilateral (or two-way) video signal.

The signal 1057 is a bilateral video signal line so that the information from the reader 1 may be received by the core 10 and the information from the core 10 may be outputted to the reader 1. The signal 1057 is applied to a buffer 1010 where it is separated from the bilateral signal into one-way signals 1058 and 1070. The signal 1058 is the 8-bit multi-level video signal from the reader 1 and it is applied to a succeeding stage LUT 1011, which converts the image information from the reader 1 to a desired value by a look-up table.

The output signal 1059 from the LUT 1011 is applied to a binarization circuit 1012 or a selector 1013. The binarization circuit 1012 has a simple binarization function to binarize the multi-level signal 1059 by a fixed slice level, a binarization function by a variable slice level in which the slice level varies from a value of a pixel around a pixel under consideration, and a binarization function by an error spread method.

The information binarized by the binarizing circuit 1012 is converted to a multi-level signal (00H) when it is "0", and to (FFH) when it is "1", and it is applied to a succeeding stage selector 1013, which selects the signal from the LUT 1011 or the output signal from the binarization circuit 1013. The output signal 1060 from the selector 1013 is applied to a selector 1014, which selects a signal 1064 which applies video signals from the facsimile unit 4, the file unit 5, the computer interface unit 7, the formater 8 and the image memory 9 to the core 10 through the connectors 1005, 1006, 1007, 1008 and 1009, respectively, or the output signal 1060 of the selector 1013, by the command from the CPU 1003.

The selector 1014 selects the signal 1060 from the selector 1013 or the signal 1014 from the facsimile unit 4, the file unit 5, the computer interface unit 7, the formater 8 or the image memory 9, by the command from the CPU 1003.

The output signal 1061 of the selector 1014 is applied to a rotation circuit 1015 or the selector 1016. The rotation circuit has a function of rotating an input image signal by +90 degrees, −90 degrees or +180 degrees. The information from the reader 1 is converted to a binary signal in the binarization circuit 1012 and then supplied to the rotation circuit 1015 and stored in a memory in the rotation circuit 1015.

The information stored in the memory of the rotation circuit 1015 is read after the rotation by the command from the CPU 1003. The selector 1016 selects one of the output signal 1062 of the rotation circuit 1015 and the output signal 1061 of the selector 1014 to produce an output signal 1063, which is applied to one input of a selector 1017, the connector 1005 to the facsimile unit 4, the connector 1006 to the file unit 5, the connector 1007 to the computer interface unit 7, the connector 1008 to the formater 8 and the connector 1009 to the image memory 9.

The signal 1063 from the selector 1016 is a one-way video bus of a synchronous 8-bit configuration for transferring the image information from the core 10 to the facsimile unit 4, the file unit 5, the computer interface unit 7, the formater 8 and the image memory 9.

The signal 1064 is a one-way video bus of a synchronous 8-bit configuration for transferring the image information from the facsimile unit 4, the file unit 5, the computer interface unit 7, the formater 8 and the image memory 9 to the core 10. The video control circuit 1004 controls the synchronous buses of the signals 1063 and 1064, and it controls by the output signal 1056 from the video control circuit 1004. The signal 1054 is also applied to the connectors 1005 to 1009. The signal 1054 is a bilateral 16-bit CPU bus which exchanges data commands in an asynchronous manner.

The transfer of the information between the facsimile unit 4, the file unit 5, the computer interface unit 7, the formater 8 and the image memory 9, and the core 10 is done by using the two video buses 1063 and 1064 and the CPU bus 1054.

The selector 1017 selectively outputs the signal 1063 or the signal 1064 by the command of the CPU 1003. The output signal 1065 of the selector 1017 is supplied to a pattern matching circuit 1018, and selectors 1019 and 1021. The pattern matching circuit 1018 compares the input signal 1065 with a predetermined pattern, and if it matches, it produces a predetermined multi-level signal as the signal 1066. If the pattern does not match, it outputs the input signal 1065 as the signal 1066 as it is.

The selector 1019 selectively outputs the signal 1065 or the signal 1066 by the command of the CPU 1003. The output 1067 of the selector 1019 is applied to the succeeding stage LUT 1020, which converts it in accordance with a characteristic of the printer 2 when it outputs the image information to the printer 2. The selector 1021 selectively outputs the output signal 1068 of the LUT 1020 or the signal 1065 by the command of the CPU 1003. The output signal of the selector 1021 is supplied to a succeeding stage enlarging circuit 1022.

The enlarging circuit 1022 may separately set magnification factors of X direction and Y direction by the command from the CPU 1003. In the enlargement circuit 1022, the enlargement process is carried out by a one-order linear interpolation method. The output signal 1070 of the enlarging circuit 1022 is supplied to a buffer 1010.

The signal 1071 supplied to the buffer 1010 is converted to a bilateral signal 1057 by the command of the CPU 1003 and it is sent to the printer 2 through the connector 1001 where it is printed out.

As described above, the core 10 and the respective units (the facsimile unit 4, the file unit 5, the computer interface unit 7, the formater 8 and the image memory 9) are connected by four signals, that is two 8-bit video buses, the bilateral 16-bit CPU bus and the video control signal.

The 8-bit video bus is used with the video control signal and the outputting of the data from the core 10 to the respective units and the inputting of the data from the respective units to the core 10 are conducted by the synchronous transfer method synchronized with a clock. In the present embodiment, the data can be transferred at a rate of approximately 12.5M bytes/second.

The video bus 1063 for outputting the data from the core 10 to the respective units is connected in parallel to the respective units. Thus, parallel output from the core 10 to the respective units is attained. Specifically, the image information from the reader 1 may be parallelly transferred to the facsimile unit 4 and the file unit 5 to simultaneouly conduct the facsimile transmission and the filing of the document sheet.

The video bus 1064 for inputting the data from the respective units to the core 10 selects data from the respective units by the video control signal 1056 and supplies it to the core 10.

The bilateral 16-bit CPU bus transfers the data by the asynchronous method. In the present embodiment, the transfer rate is 4M bytes/second at maximum.

As described above, the data transfer between the core 10 and the respective units may be done through either the video bus or the CPU bus. Which one of the two buses is to be used is determined by the communication between the CPU 1003 of the core 10 and the CPU 412 of the facsimile unit 4 through the CPU bus and a dual port memory 410. When the CPU bus is busy, the CPU 1003 of the core 10 transfers the data by using the video bus.

The video bus and the CPU bus may be operated in a completely independent parallel fashion. While the data is transferred between one unit and the core 10 through the video bus, the core 10 may transfer the data to the other unit through the CPU bus.

An example of the flow of signals between the core and the respective units in the present invention is now explained.

<Operation of the core 10 by the information of the facsimile unit 4>

The outputting of the information to the facsimile unit 4 is first explained.

The CPU 1003 communicates with the CPU 122 of the reader 1 through the communication IC 1002 to issue a document sheet scan command. In response to the command, the reader 1 scans the document sheet by the scanner unit 104 to output the image information to the connector 120. The reader 1 and the external device 3 are connected through a cable and the information from the reader 1 is supplied to the connector 1001 of the core 10.

The image information supplied to the connector 1001 is supplied to the buffer 1010 through the multi-level 8-bit signal line 1057. The buffer circuit 1010 supplies the bilateral signal 1057 to the LUT 1011 through the signal line 1058 as a one-way signal by the command of the CPU 1003. The LUT 1011 converts the image information from the reader 1 to a desired value by using a built-in look-up table. For example, it skips background of the document sheet.

The output signal 1059 of the LUT 1011 is supplied to the succeeding stage binarization circuit 1012, which converts the 8-bit multi-level signal 1059 to a binary signal. The binarizing circuit 1012 converts it to (00H) when the binarized signal is "0", and to (FFH) when it is "1". The output signal of the binarization circuit 1012 is supplied to the rotation circuit 1015 or the selector 1016 through the selectors 1013 and 1014. The output signal 1062 of the rotation circuit 1015 is also supplied to the selector 1016 which selects either the signal 1061 or the signal 1062. The selection of the signal is determined by the communication between the CPU 1003 and the facsimile unit 4 through the CPU bus 1054. The output signal 1063 from the selector 1016 is supplied to the facsimile unit 4 through the connector 1005.

The reception of the information from the facsimile unit 4 is now explained. The image information from the facsimile unit 4 is sent to the signal line 1064 through the connector 1005. The signal 1064 is supplied to the selectors 1014 and 1017.

When the image received by facsimile unit 4 is to be rotated and outputted to the printer 2 by the command of the CPU 1003, the signal 1064 applied to the selector 1014 is rotated in the rotation circuit 1015. The output signal 1062 from the rotation circuit 1015 is applied to the pattern matching circuit 1018 through the selectors 1016 and 1017 to produce signals 1064 and 1065.

When the image received by the facsimile unit 4 is to be supplied to the printer 2 as it is by the command of the CPU 1003, the signal 1064 supplied to the selector 1017 is applied to the pattern matching circuit 1018, which has a smoothening function to smoothen unevenness of the received facsimile data image. The signal pattern-matched by the pattern matching circuit 1018 is sent to the LUT 1020 through the selector 1019.

The table of the LUT 1021 may be changed by the CPU 1003 so that the image received by the facsimile unit 4 is supplied to the printer 2 at a desired density. The output signal 1068 of the LUT 1020 is supplied to the enlarging circuit 1022 through the selector 1021. The enlarging circuit 1022 enlarges the 8-bit multi-level value having the two multi-level 8-bit values (00H and FFH) by the one-order linear interpolation method. The 8-bit multi-level signal from the enlarging circuit 1022 is sent to the reader 1 through a buffer 1011 and a connector 1001.

The reader 1 supplies that signal to an external I/F switching circuit 119 through the connector 120. The external I/F switching circuit 119 supplies the signal from the facsimile unit 4 to the Y signal generation/color detection circuit 113. The output signal from the Y signal generation/color detection circuit 113 is processed in the manner described above and supplied to the printer 2 to form an image on the output form.

<Operation of the core 10 by the information of the file unit 5>

The outputting of the information to the file unit 5 is first described.

The CPU 1003 communicates with the CPU 122 of the reader 1 through the communication IC 1002 to issue a document sheet scan command. When the reader 1 receives that command, it reads the document sheet by scanning the document sheet mounted on the document sheet table glass 102 by the scanner unit 104 and supplies the read image information to the connector 120. The reader 1 and the external device 3 are connected by the cable and the information from the reader 1 is supplied to the connector 1001 of the core 10.

The image information supplied to the connector 1001 is converted to a one-way signal 1058 by the buffer 1010. The signal 1058 which is the multi-level 8-bit signal is sent through the multi-level 8-bit signal line 1057 and the buffer 1010 to the LUT 1011, which converts it to a desired signal. The output signal 1059 of the LUT 1011 is sent to the connector 1006 through the selectors 1013, 1014 and 1016. Namely, it is transferred to the file unit 5 as the 8-bit multi-level signal without using the functions of the binarization circuit 1012 and the rotation circuit 1015.

When the binary signal is to be filed by the communication with the file unit 5 through the CPU bus 1054 of the CPU 1003, the functions of the binarization circuit 1012 and the rotation circuit 1015 and used. The binarization operation of the binarization circuit 1012 and the rotation operation of the rotation circuit 1015 are identical to those for the facsimile unit 4 and the explanation thereof is omitted.

The reception of the information from the file unit 5 is now explained.

The image information from the file unit 5 is sent through the connector 1006 as the signal 1064. The signal 1064 is applied to the selector 1014 or the selector 1017.

When the binary signal is to be filed, it is processed in the same manner as it is by the facsimile unit 4. The filing of the binary signal is same as that in the facsimile unit 4 and the explanation thereof is omitted.

On the other hand, when the 8-bit multi-level signal is to be filed, it may be applied to the selector 1014 or the selector 1017. Namely, in filing the multi-level signal, the output signal 1065 from the selector 1017 is applied to the LUT 1020 through the selector 1019. The LUT 1020 prepares a look-up table in accordance with a desired print density by the command of the CPU 1003. The input signal is converted in accordance with the desired print density by using the look-up table to produce an output signal 1068.

The output signal 1068 from the LUT 1020 is supplied to the enlarging circuit 1022 through the selector 1021. The 8-bit multi-level signal 1070 enlarged at the desired enlargement factor is sent to the reader 1 through the buffer 1010 and the connector 1001. The information of the file unit sent to the reader 1 is outputted to the printer 2 as it is in the facsimile unit to form an image on the output form.

<Operation of the core 10 by the information of the computer interface unit 7>

The computer interface unit 7 interfaces with the computer 11 connected to the external device 3. It has SCSI and RS232C as the computer interface, and parallel printer interface (Centronics interface).

The computer interface unit 7 has the above three interfaces and the information from the respective interfaces are sent to the CPU 1003 through the connector 1007 and the data bus 1054. The CPU 1003 performs various controls in accordance with the contents supplied thereto.

<Operation of the core 10 by the information of the formater 8>

The formater 8 has a function to develop command data of the document file sent from the computer interface unit 7 to image data.

When the CPU 1003 determines that the data sent from the computer interface unit 7 through the data bus 1054 is the data relating to the formater 8, it transfers the data to the formater 8 through the connector 1008. The formater develops the transferred data to image data and stores it in a memory as a visual image.

<Procedure of receiving information from the formater 8 and forming an image on an output form>

The image information from the formater 8 is transmitted to the signal line 1064 through the connector 1008 as the multi-level signal having two values (00H, FFH). The signal 1064 from the formater 8 is applied to the selector 1014 and the selector 1017. The CPU 1003 controls the selectors 1014 and 1017 to process the data in the same manner as that described above. The subsequent process is same as that for the facsimile unit 4 and the explanation thereof is omitted.

<Operation of the core 10 by the information of the image memory 9>

The outputting of the information of the image memory 9 is first explained.

The CPU 1003 communicates with the CPU 122 of the reader 1 through the communication IC 1002 to issue a document sheet scan command. When the reader receives this command, it reads the document sheet by scanning the document sheet mounted on the document sheet table glass 102 by the scanner unit 104 and supplied the read image information to the connector 120. The reader 1 and the external device 3 are connected by the cable and the information of the reader 1 is supplied to the connector 1001 of the core 10.

The image information supplied to the connector 1001 is converted to a one-way signal 1058 by the buffer 1010. The signal 1058 which is the multi-level 8-bit signal is sent to the LUT 1011 through the multi-level 8-bit signal line 1057 and the buffer 1010 and it is converted to a desired signal by the LUT 1011. The multi-level image signal which is the output signal 1059 of the LUT 1011 is transferred to the image memory 9 through the selectors 1013, 1014 and 1016 and the connector 1009, and stored therein.

The image information stored in the image memory 9 is sent to the CPU 1003 through the CPU bus 1054 of the connector 1009. The CPU 1003 transfers the data sent from the image memory 9 to the computer interface unit 7, which transfers it to the computer 11 with a desired one of the three interfaces (SCSI, RS232C, Centronics).

The reception of the information from the image memory 9 is now explained.

The image information is sent from the computer 11 to the core 10 through the computer interface unit 11. When the CPU 1003 of the core 10 determines that the data sent from the computer interface unit 7 through the CPU bus 1054 is the data relating to the image memory 9, it transfers the data received through the connector 1009 to the image memory 9 and stores it therein.

Then, the image memory 9 sends the 8-bit multi-level signal 1064 to the selectors 1014 and 1017 through the connector 1009. The output signal from the selector 1014 or the selector 1017 is supplied to the printer 2 by the command of the CPU 1003 and an image is formed on the print form, as it is for the facsimile unit 4.

<Detail of the facsimile unit 4>

A detailed configuration of the facsimile unit 4 is now explained with reference to FIG. 5.

Figure 5:
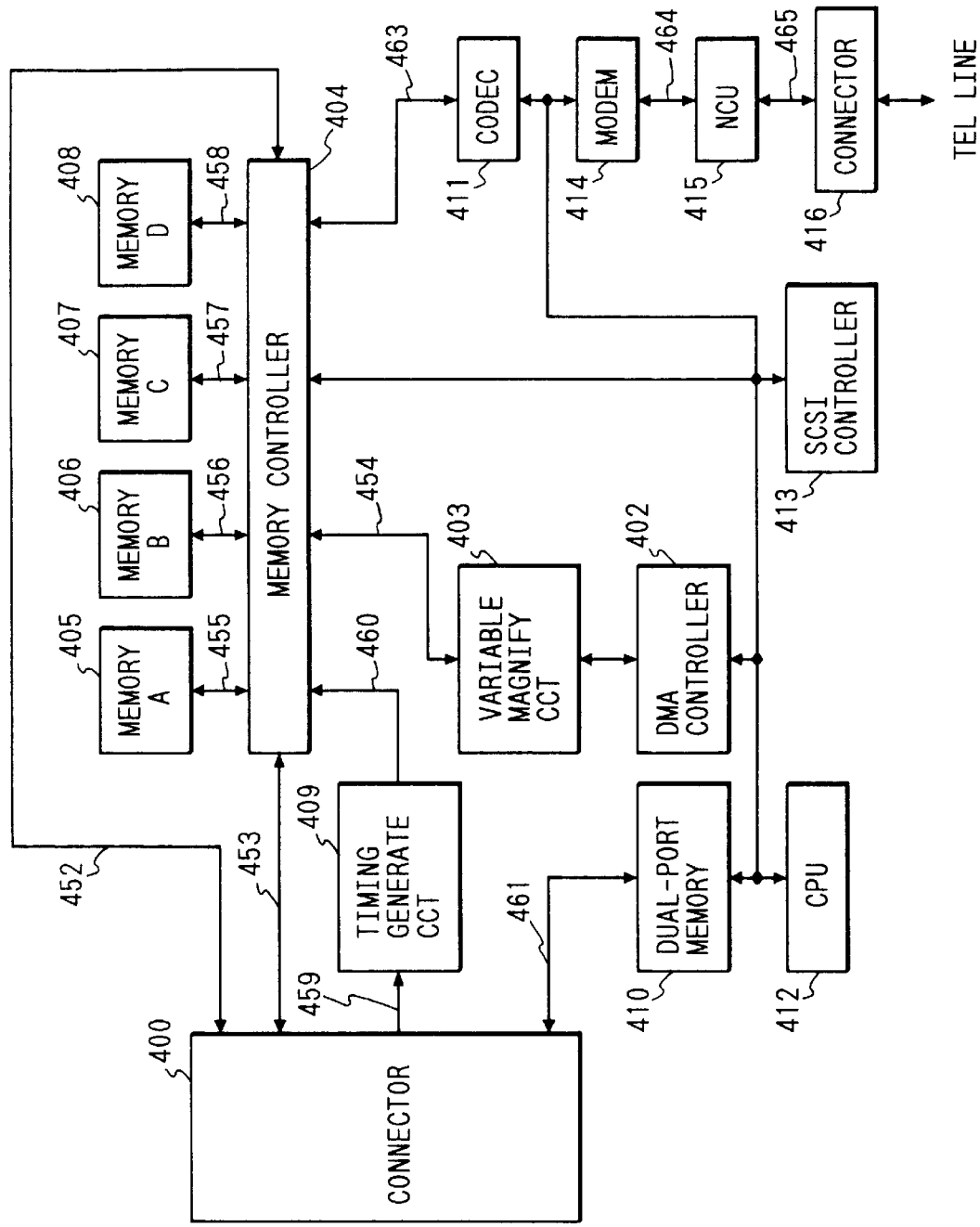
FIG. 5 shows a block diagram of a detailed configuration of a facsimile unit of FIG. 1.

As shown in FIG. 5, the facsimile unit 4 is connected to the core 10 by the connector 400 and exchanges signals with the core 10 through the connector 400.

The memory controller 404 has five functions, a mode for exchanging data between a memory A 405, a memory B 406, a memory C 407 or a memory D 408 and a CPU bus 462, a mode for exchanging data with a CODEC bus 463 of a CODEC 411 having a coding/decoding function, a mode for exchanging data on a bus 454 from a variable magnification circuit 403 and the contents of the memory A 405, the memory B 407, the memory C 407 or the memory D 408 by the control of a DMA controller 402, a mode for storing binary video input data 453 to one of the memories A–D 405–408 under the control of a timing generation circuit 409, and a mode for reading the content of the memory from one of the memories A–D 405–408 to output it to a signal line 452.

Each of the memories A–D 405–408 has a 2M bytes capacity, and can substantially store an image of size A4 when the resolution of the information is 400 dpi. The memory capacity is not limited to the above example and it may be larger or any capacity.

When the binary information from the core 10 is to be stored in one of the memories A–D 405–408, the signal 453 from the connector 400 is supplied to the memory controller 404. Thus, when the signal 453 is applied to the memory controller 404, it controls such that the received binary information is stored in one of the memories A–D 405–408 or a memory which is a cascade connection of any two of the above memories.

The timing generation circuit 409 is connected to the connector through the signal line 459. It is activated by a control signal (HSYNC, HEN, VSYNC, VEN) from the core 10 to generate a signal to attain the following two functions. The first function is to store the image signal from the core 10 into one or two of the memories A–D 405–408 and the second function is to read from one of the memories A–D 405–408 and send it to the signal line 452.

The dual port memory 410 is connected to the CPU 1003 of the core 10 through the signal line 461, and on the other hand, connected to the CPU 412 of the facsimile unit 4 through the signal line 462. The respective CPU's exchange the commands through the dual port memory 410.

The CODEC 411 reads the image information stored in one of the memories A–D 405–408, encodes it in a desired coding method such as MH, MR, MMR and stores it in one of the memories A–D 405–408 as coded information. It also reads the coded information stored in the memories A–D 405–408, encodes it in the desired method such as MH, MR, MMR and stores it in one of the memories A–D 405–408 as image information.

The CPU 412 centrally controls the respective units of the facsimile unit 4 through the CPU bus 462, and it is connected to the core 10 through the dual port memory 410.

A SCSI controller 413 interfaces with a hard disk drive connected to the facsimile unit 4 of FIG. 1. It controls the storing of the transmission data in the facsimile transmission mode and the reception data in the facsimile reception mode in the hard disk of FIG. 1, and the reading of it.

A MODEM 414 modulates the coded information from the hard disk connected to the CODEC 411 or the SCSI controller 413 to transmit it to a telephone line, and demodulates the information sent from a network control unit NCU 415 to convert it to coded information, and transfers the decoded information to the hard disk connected to the SCSI controller 413.

The NCU 415 is directly connected to the telephone line through the connector 416 and controls the network for exchanging information with a switch installed in a telephone station in a predetermined protocol.

An example of the facsimile transmission and reception control by the facsimile unit 4 in the present embodiment is now explained.

The binary image signal from the reader 1 is applied to the facsimile unit 4 through the connector 400 and it is sent to the memory controller 404 through the signal line 453. Two image data from the core 10 sent to the memory controller 404 through the signal line 453 are stored in the memory A 405 by the control of the memory controller 404.

The timing for storage in the memory A 405 (a memory control signal) is determined by the timing generation circuit 409 based on the timing signal sent from the reader 1 through the signal line 459.

The CPU 412 connects the memories A and B 405 and 406 of the memory controller 404 to the bus line 463 of the CODEC 411, which reads the image information from the memory A 405, encodes it by the MR coding method and writes it in the memory B 406.

When the CODEC 411 encodes the image signal of size A4, for example, the CPU 412 connects the memory B 406 connected to the memory controller 404 to the CPU bus 462. Then, the CPU 412 sequentially reads the information previously coded by the CODEC 411 from the memory B 406, and transfers it to the MODEM 414.

The MODEM 414 modulates the transferred coded information and sends the modulated signal to the destination facsimile unit which has previously been called and connected, through the NCU 415 and the telephone line. The facsimile transmission control by the MODEM 414 and the NCU 416 is known and the detailed explanation thereof is omitted.

A flow of data in the facsimile reception mode of the present invention is now explained.

When the call to the destination unit is detected by the NCU 416, the NCU responds to the call in a predetermined protocol. Then, facsimile information is sent from the destination unit in accordance with the facsimile control protocol. The information sent over the telephone line is sent to the MODEM 414 through the NCU 415 and demodulated thereby. The CPU 412 stores the demodulated signal from the MODEM 414 in the memory C 407 through the CPU bus 462.

When one screen of information is stored in the memory C 407, the CPU 412 controls the memory controller 404 to connect the data line 457 of the memory C 407 to the line 463 of the CODEC 411. The CODEC 411 sequentially reads the coded information of the memory C 407 and decodes it, that is, converts it to the image information, and stores it in the memory D 408.

The CPU 412 communicates with the CPU 1003 of the core 10 through the dual port memory 410 to make various settings necessary to print out the image by the printer 2 from the memory D 408 through the core 10. When the setting is done, the CPU starts the timing generation circuit 409. When it is started, the timing generation circuit 409 generates a memory access timing signal based on the control signal from the signal line 459 and supplies the generated timing signal to the memory controller 404 through the signal line 460.

The memory controller 404 reads the image information from the memory D 408 in synchronism with the signal from the timing generation circuit 409, sends it to the signal line 452, and supplied it to the connector 400. The control of the output from the connector 400 to the signal line 452 is same as that for the core 10 and the detailed explanation thereof is omitted.

<Detail of the file unit 5>

A detailed configuration of the file unit 5 is now explained with reference to FIG. 6.

Figure 6:
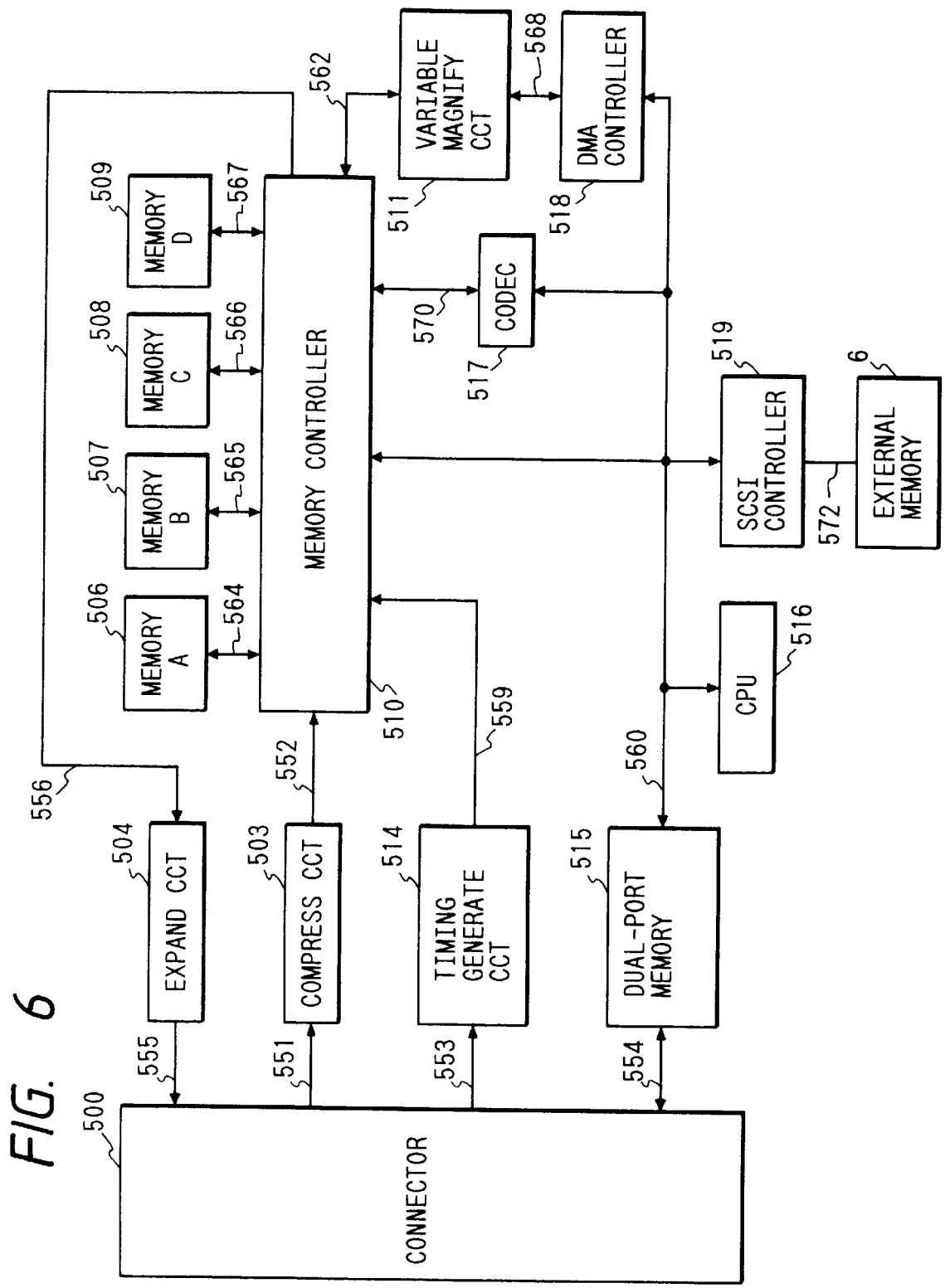
FIG. 6 shows a block diagram of a detailed configuration of a file unit shown in FIG. 1.

The file unit 5 is connected to the core 10 through a connector 500 shown in FIG. 6 to exchange various signals. The multi-level input signal 551 is applied to a compression circuit 503, which compresses the multi-level input signal to convert it to a multi-level image information color compressed information and supplies it to the memory controller 510.

The output signal 552 of the compression circuit 503 is sent to the memory controller 510 and it is stored in one of the memories A–D 506–509 or a pair of cascade-connected ones under the control of the memory controller 510.

The memory controller 510 has five modes, a mode for exchanging data between the CPU bus 560 and the memories A–D 506–509 by the command of the CPU 516, a mode for exchanging data with the CODEC bus 570 of the CODEC 517 which encodes and decodes data, a mode for exchanging data between the bus 562 from the variable magnification circuit 511 and the memories A–D 506–509 under the control of the DMA controller 518, a mode for storing the information from the signal line 552 to one of the memories A–D 506–509 under the control of the timing generation circuit, and a mode for reading the content of one of the memories A–D 506–509 to output it to a signal line 556.

Each of the memories A–D 506–509 has a 2M bytes capacity and can substantially store an image of a size A4 when the resolution power is 400 dpi. The memory capacity is not limited thereto and a larger capacity may be used.

The timing generation circuit 514 is connected to the connector through the signal line 553 and it is started by the control signal (HSYNC, HEN, VSYNC, VEN) from the core 10 to generate a signal to attain the following two functions. The first function is to store the information from the core 10 into one or two of the memories A–D 506–509, and the second function is to read the content of one of the memories A–D 506–509 to output it to the signal line 556.

The dual port memory 515 is connected to the CPU 1003 of the core 10 through the signal line 554, and to the CPU 516 of the file unit 5 through the signal line 560. The CPU 516 exchanges commands with the CPU 1003 through the dual port memory 515.

The SCSI controller 519 interfaces with the external storage device 6 connected to the file unit of FIG. 1. The external storage device 6 is specifically a magneto-optical disk which stores data such as image information.

The CODEC 517 reads the image information stored in one of the memories A–D 506–509, encodes it in a desired encoding method such as MH, MR or MMR method, and store it in one of the memories A–D 506–509 as the coded information. It also reads the coded information stored in the memories A–D 506–509, decodes the information coded in the MH, MR or MMR method in a corresponding method, and stores it in one of the memories A–D 506–509 as the decoded information, that is, the image information.

The storing of the file information to the external storage device by the file unit 5 in the present embodiment is now explained.

The 8-bit multi-level signal from the reader 1 is applied to the connector 500 and supplied to the compression circuit 503 through the signal line 551. When the compression circuit 503 receives the multi-level image signal from the signal line 551, it converts the multi-level image signal to the compressed signal 552. The compressed signal 552 from the compression circuit 503 is supplied to the memory controller 510.

The timing generation circuit 514 generates the timing signal 559 by the signal 553 from the core 10 and supplies it to the memory controller 510, which store the compressed signal 552 from the compression circuit 503 in the memory A 506 in accordance with the timing signal 559 from the timing generation circuit 514.

Then, the CPU 516 connects the memories A and B 506 and 507 of the memory controller 510 to the bus line 570 of the CODEC 517. When the bus connection is completed, the CODEC 517 sequentially reads the compressed information from the memory A 506, encodes it by the MR coding method, for example, and writes the coded information to the memory B 507.

When the CODEC 517 encodes the desired amount of compressed information stored in the memory A 506, the CPU 516 connects the memory B 507 of the memory controller 510 to the CPU bus 560. The CPU 516 sequentially reads the coded information from the memory B 507 and transfers it to the SCSI controller 519, which stores the coded information 572 sent from the CPU 516 into the external storage device 6.

An embodiment for reading of the information stored in the external storage device 6 and supplying it to the printer 2 is now explained.

When the CPU 516 receives an information retrieve/print command, it reads target coded information from the external storage device 6 through the SCSI controller 519 and transfers it to the memory C 508. The memory controller 510 connects the CPU bus 560 to the bus 566 of the memory C 508 by the command of the CPU 516.

When the transfer of the coded information from the external storage device 6 to the memory C 508 is over, the CPU 516 controls the memory controller 510 to connect the memories C and D 508 and 509 to the bus 570 of the CODEC 517. The CODEC 517 reads the coded information from the memory C 508, sequentially decodes it, transfers it to the memory D 509 and store it therein.

Where the magnification change such as enlarging or reduction is needed when the information to be stored in the memory D 509 is supplied to the printer 2, the memory D 509 is connected to the bus 562 of the variable magnification circuit 511 and the content of the memory D 509 is sent to the variable magnification circuit 511 under the control of the DMA controller 518 to change the magnification.

The CPU 516 communicates with the CPU 1003 of the core 10 through the dual port memory 515 and makes various settings to the printer 2 necessary to print out the image, from the memory D 509 through the core 10. When the setting is over, the CPU 516 starts the timing generation circuit 514 to supply the predetermined timing signal to the memory controller from the signal line 559.

The memory controller 510 reads the decoded information from the memory D 509 in synchronism with the signal from the timing generation circuit 514 and sends it to the signal line 556. The signal line is connected to an expansion circuit 504 where the decoded signal is expanded to produce an output signal 555. The output signal 555 of the expansion circuit 504 is sent to the core 10 through the connector 500. The process from the core 10 to the printer 2 is same as that of the core 10 and the explanation is omitted.

<Detail of the computer interface unit 7>

A detail configuration of the computer interface unit 7 of the present embodiment is now explained with reference to FIG. 7.

Figure 7:
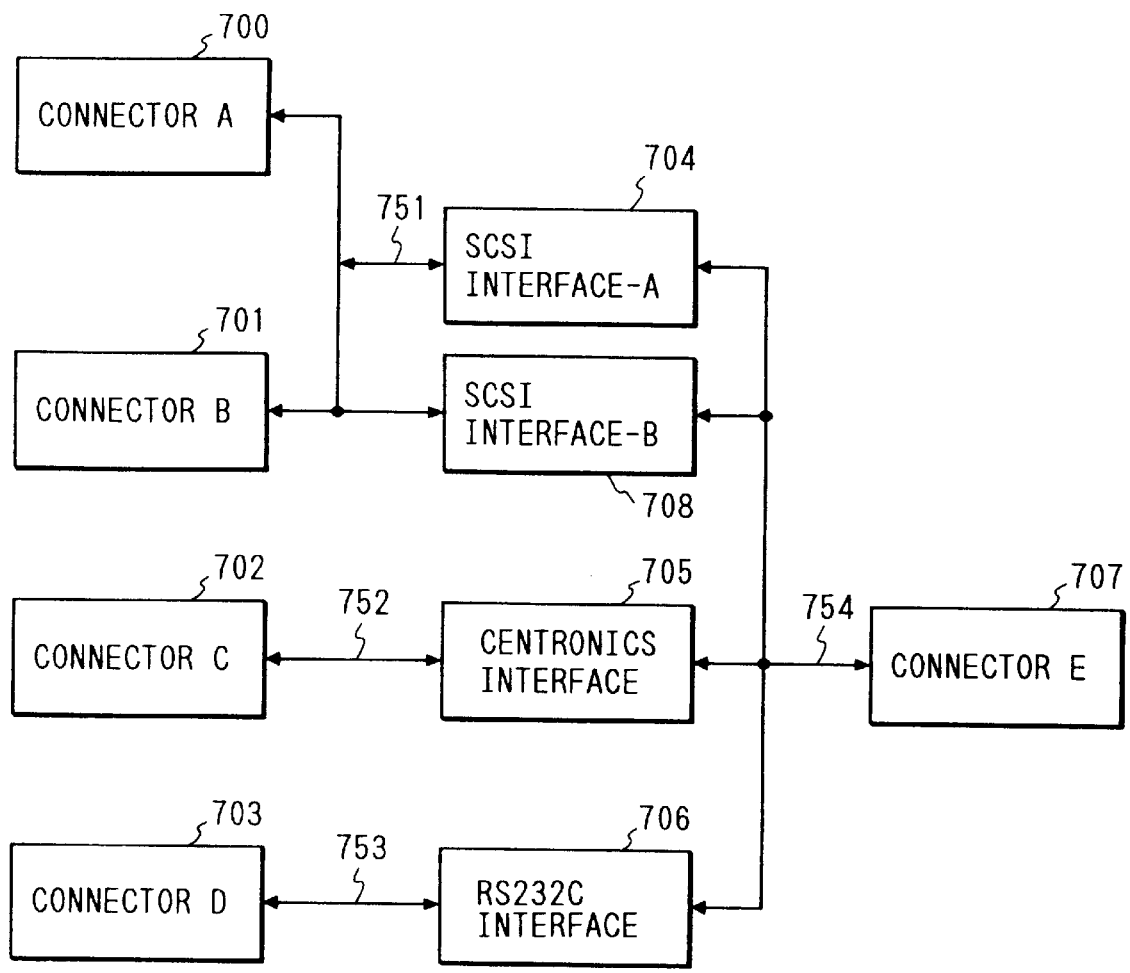
FIG. 7 shows a block diagram of a detailed configuration of a computer interface unit shown in FIG. 1.

In FIG. 7, a connector A 700 and a connector B 701 are SCSI interface connectors. A connector C 702 is a parallel printer interface (Centronics interface) connector. A connector D 703 is an RS232C interface connector. A connector E 707 is a connector for connecting with the core 10.

The SCSI interface has two connectors (the connector A 700 and the connector B 701). When a devise having a plurality of SCSI interfaces is to be connected, it is cascade-connected by using the connectors A and B 700 and 701.

When the external device 3 and the computer (for example, PC/WS 11 in FIG. 1) are to be connected one to one, the connector A 700 and the computer are connected by the cable and a terminator is connected to the connector B 701, or the connector B 701 and the computer are connected by the cable and the terminator is connected to the connector A 700.

The information supplied from the connector A or B 700 or 701 is applied to the SCSI I/F A 704 or the SCSI I/F B 708 through the signal line 751. The SCSI I/F A 704 or the SCSI I/F B 708 performs the SCSI protocol and supplies the data to the connector E 707 through the signal line 754.

The connector E 707 is connected to the CPU bus 1054 of the core 10 and the CPU 1003 of the core 10 receives the information applied to the SCSI I/F connector (connector A 700 or B 701) from the CPU bus 1054. When the data from the CPU 1003 of the core 10 is to be supplied to the SCSI connector (connector A 700 or B 701), the reverse procedure to the above is conducted.

The Centronics I/F 705 receives the data in the predetermined protocol and supplies it to the connector E 707 through the signal line 754. The connector E 707 is connected to the CPU bus 1054 of the core 10 and the CPU 1003 of the core 10 receives the information applied to the parallel printer interface connector (connector C 702) from the CPU bus 1054.

The RS232C I/F 706 receives the data in the predetermined protocol and supplies it to the connector E 707 through the signal line 754. The connector E 707 is connected to the CPU bus 1054 of the core 10 and the CPU 1003 of the core 10 receives the information applied to the RS232C I/F connector (connector D 703) from the CPU bus 1054. When the data from the CPU 1003 of the core 10 is to be supplied to the RS232C I/F connector (connector D 703), the reverse procedure to the above is conducted.

<Detail of the formater 8>

Figure 8:
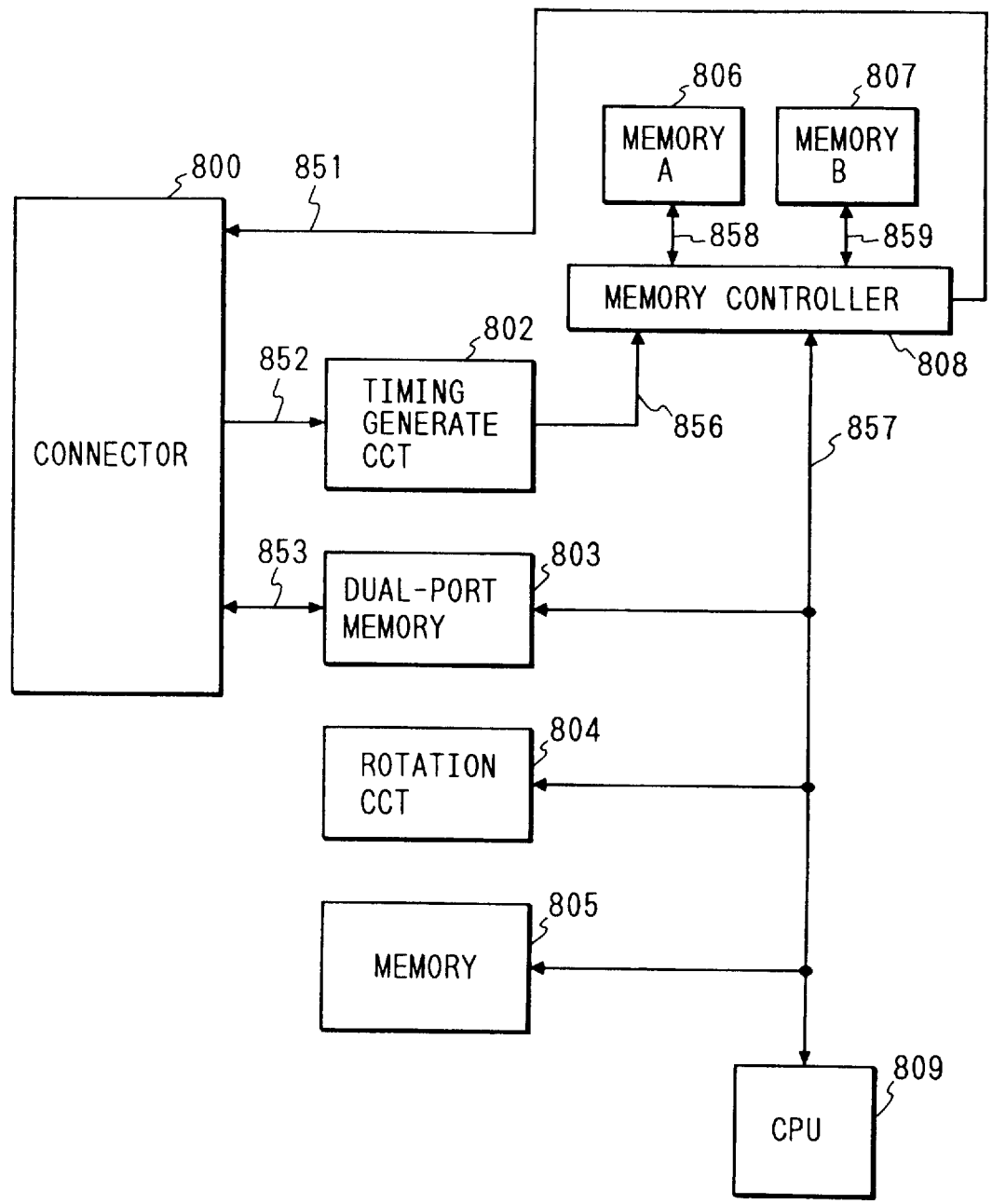
FIG. 8 shows a block diagram of a detailed configuration of a formater shown in FIG. 1.

A detail configuration of the formater 8 is now explained with reference to FIG. 8.

When the data is sent to the core 10 from the computer interface unit 7, the CPU 1003 of the core 10 determines the type of the data. If it is the data relating to the formater 8, the CPU 1003 of the core 10 transfers the data from the computer to the dual port memory 803 through the connector 1008 of the core 10 and the connector 800 of the formater 8.

The CPU 809 of the formater 8 receives the code data sent from the computer through the dual port memory 803. The CPU 809 sequentially develops the code data into the image data and transfers it to the memory A 806 or the memory B 807 through the memory controller 808. Each of the memories A and B 806 and 807 has an 1M bytes capacity and can store the image of up to size A4 when the resolution power is 300 dpi. When an image of up to size A4 is to be stored at the resolution power of 300 dpi, the image is developed by cascade-connecting the memory A 806 and the memory B 807.

The memory control is effected by the memory controller 808 by the command from the CPU 809. Where the rotation of the text or graph is needed in developing the image data, it is rotated by the rotation circuit 804 and transferred to the memory A 806 or the memory B 807. When the development of the image data to the memory A 806 or the memory B 807 is over, the CPU 809 controls the memory controller 808 to connect the data bus line 858 of the memory A 806 or the data bus line 859 of the memory B 807 to the output line 851 of the memory controller 808.

Then, the CPU 809 communicates with the CPU 1003 of the core 10 through the dual port memory 803 and sets a mode to supply the image information from the memory A 806 or the memory B 807. The CPU 1003 of the core 10 sets the control of the communication CPU 122 to the printout mode by using the communication function built in the CPU 122 of the reader 1.

The CPU 1003 of the core 10 starts the timing. generation circuit 802 through the connector 1008 and the connector 800 of the formater 8. The timing generation circuit 802 generates the timing signal to the memory controller 808 for reading the image information from the memory A 806 or the memory B 807 in accordance with the signal from the core 10.

The memory controller 808 reads the image information from the memory A 806 or the memory B 807 in accordance with the timing signal and supplies it to the signal line 858. The image signal sent from the memory controller 808 through the signal line 858 is transferred to the core 10 through the signal line 851 and the connector 800.

The control of the output from the core 10 to the printer 2 is same as that for the core 10 and the explanation thereof is omitted.

<Detail of the image memory 9>

Figure 9:
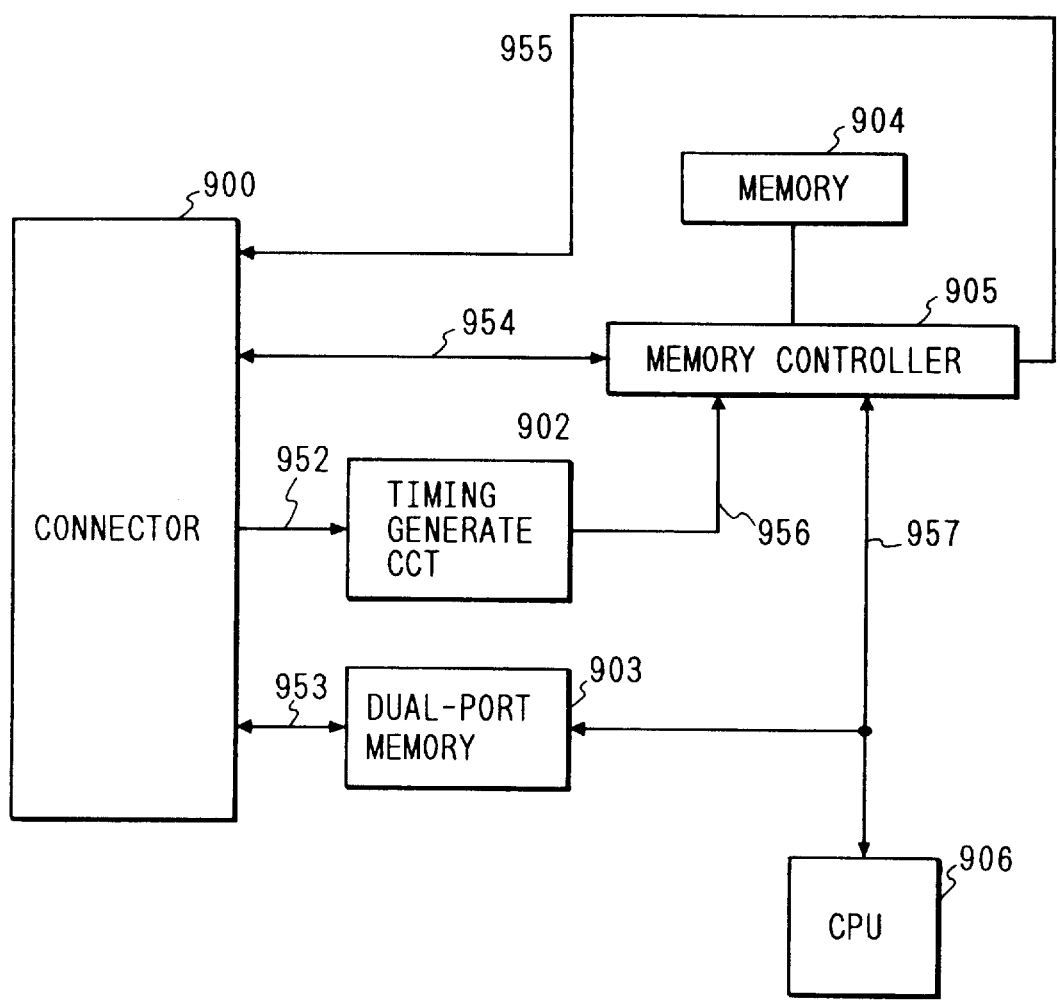
FIG. 9 shows a block diagram of a detailed configuration of an image memory shown in FIG. 1.

Detail of the image memory 9 is now explained with reference to FIG. 9.

The image memory 9 is connected to the core 10 through the connector 900 to exchange various signals with the core 10. The multi-level signal 954 is stored in the memory 904 under the control of the memory controller 905.

The memory controller 905 has three modes, a mode for exchanging data between the memory 904 and the CPU bus 957 by the command of the CPU 906, a mode for storing the data from the signal line 954 into the memory 904 under the control of the timing generation circuit 902, and a mode for reading the data stored in the memory 904 and supplying it to the signal line 955.

The memory 904 has a 32M bytes capacity and can store an image of size A3 when the resolution power is 400 dpi and tonality is 256. The memory capacity is not limited thereto and any memory capacity may be used.

The timing generation circuit 902 is connected to 7 the connector 900 through the signal line 952. It is started by the control signal (HSYNC, HEN, VSYNC, VEN) from the core 10 to generates a signal to attain the following two functions. The first function is to store the information from the core 10 into the memory 904 and the second function is to read the information stored in the memory 904 and send it to the signal line 955.

The dual port memory 903 is connected to the CPU 1003 of the core 10 through the signal line 953. The dual port memory 903 is also connected to the CPU 906 of the image memory 9 through the signal line 957. The respective CPU's exchange commands through the dual port memory 903.

The control for storing the image information to the image memory 9 and the transfer of the stored information to the computer is now explained.

The 8-bit multi-level information from the reader 1 is supplied to the controller 905 through the connector 900. The timing generation circuit 902 generates the timing signal 956 in accordance with the signal 952 from the core 10 and supplies it to the memory controller 905.

The memory controller 905 stores the information of the signal line 954 in the memory 904 in accordance with the timing signal 956 supplied from the timing generation circuit 902. Then, the CPU 906 connects the memory 904 of the memory controller 905 to the CPU bus 957. The CPU 906 then sequentially reads the image information from the memory 904 and transfers it to the dual port memory.

The CPU 1003 of the core 10 reads the image signal of the dual port memory 903 of the image memory 9 through the signal line 953 and the connector 900 and transfers it to the computer interface 7. The transfer of the information from the computer interface 7 to the computer is described above and the explanation thereof is omitted.

An embodiment for outputting the image information sent from the computer to the printer 2 is now explained.

The image signal sent from the computer is sent to the core 10 through the computer interface 7. The CPU 1003 of the core 10 transfers the image information to the dual port memory 903 of the image memory 9 through the CPU bus 1054 and the connector 1009.

The CPU 906 controls the memory controller 905 to connect the CPU bus 957 to the memory bus 904. The CPU 906 then transfers the image information from the computer stored in the dual port memory 903 to the memory 904 through the memory controller 905 and stores it therein.

When the transfer of the image information to the memory 906 is completed, the CPU 906 controls the memory controller 905 to connect the data line of the memory 904 to the signal line 955. The CPU 906 also communicates with the CPU 1003 of the core 10 through the dual port memory 903 to make setting for printing out the image to the printer 2 from the memory 904 through the core 10.

When the setting is over, the CPU 906 starts the timing generation circuit 902, which generates a predetermined timing signal based on the signal from the signal line 952 and supplies it to the memory controller 905 through the signal line 956.

The memory controller 905 reads the image information from the memory 904 in synchronism with the signal from the signal line 952, sends it to the signal line 955 and supplies it to the connector 900. The outputting from the connector 900 to the printer 3 is same as that for the core 10 and the explanation is omitted.

In accordance with the present invention, the core and the respective units are connected through the synchronous bus and the asynchronous bus and the data is exchanged through the both buses so that the time required for the data transmission is relatively reduced and the very efficient data transfer is attained.

The present invention may be applied to either a system comprising a plurality of equipments or a system comprising a single equipment. The present invention may also applied to a system or an apparatus with a program.

In accordance with the present invention, the main unit and the sub-unit are connected through the synchronous bus and the asynchronous bus and the data is exchanged through the both buses. Accordingly, the time required to transfer the data is relatively reduced and the efficient data transfer is attained.

The present invention is not limited to the above embodiments but various modifications may be made.

What is claimed is:

1. An information processing system comprising:
   a main unit including a synchronous bus and an asynchronous bus, said main unit comprising selecting means for selecting one of said buses for transferring given data; and
   a plurality of sub-units controlled by said main unit, each of said plurality of sub-units being connected to both of the synchronous and asynchronous buses,
   wherein transfer of the given data between the main unit and each of said sub-units is executable through the synchronous bus and through the asynchronous bus.

2. An information processing system according to claim 1 wherein at least two sub-units are connected to said main unit, and the data transfer by said synchronous bus between a first sub-unit and said main unit and the data transfer by the asynchronous bus between a second sub-unit and said main unit are independently executed.

3. An information processing system according to claim 1 wherein a plurality of sub-units are provided, and wherein when a connection bus between said main unit and one of said sub-units is a synchronous bus, the data transfer from said main unit to said one-sub-unit is parallelly executable to a plurality of other sub-units.

4. An information processing system according to claim 1 wherein the data transfer by the synchronous bus between said main unit and said sub-unit is determined by the communication through the asynchronous bus between said main unit and said sub-unit.

5. An information processing system according to claim 1 wherein said sub-unit is a facsimile communication unit, a file unit, a computer interface unit, a formater or an image memory.

6. An information processing system according to claim 5 wherein said main unit is a controller for controlling the facsimile communication unit, the file unit, the computer interface unit, the formater or the image memory unit.

7. An information processing system comprising:
   a core unit having a synchronous bus and an asynchronous bus, said core unit comprising selecting means for selecting one of said buses for transferring given data; and
   a facsimile unit controlled by said core unit, said facsimile unit being connected to both of the synchronous and asynchronous buses,
   wherein transfer of the given data between said core unit and said facsimile unit is executable through the synchronous bus and through the asynchronous bus.

8. An information processing system according to claim 7 wherein the data transfer by the synchronous bus between said core unit and said facsimile unit is determined by communication through the asynchronous bus between said core unit and said facsimile unit.

9. An information processing system according to claim 7 wherein said core unit is a controller for controlling the facsimile unit.

10. An information processing system comprising:
    a core unit having a synchronous bus and an asynchronous bus, said core unit comprising selecting means for selecting one of said buses for transferring given data; and
    a file unit controlled by said core unit, said file unit being connected to both of the synchronous and asynchronous buses,
    wherein transfer of the given data between said core unit and said file unit is executable through the synchronous bus and through the asynchronous bus.

11. An information processing system according to claim 10, wherein the data transfer by the synchronous bus between said core unit and said file unit is determined by communication through the asynchronous bus between said core unit and said file unit.

12. An information processing system according to claim 10 wherein said core unit is a controller for controlling the file unit.

13. An information processing system comprising:
    a core unit having a synchronous bus and an asynchronous bus, said core unit comprising selecting means for selecting one of said buses for transferring given data; and
    a computer interface unit controlled by said core unit, said computer interface unit being connected to both of the synchronous and asynchronous buses,
    wherein transfer of the given data between said core unit and said computer interface unit is executable through the synchronous bus and through the asynchronous bus.

14. An information processing system according to claim 13, wherein the data transfer by the synchronous bus between said core unit and said computer interface unit is determined by communication through the asynchronous bus between said core unit and said computer interface unit.

15. An information processing system according to claim 13, wherein said core unit is a controller for controlling the computer interface unit.

16. An information processing system comprising:
    a core unit having a synchronous bus and an asynchronous bus, said core unit comprising selecting means for selecting one of the buses for transferring given data; and
    a formatter unit controlled by said core unit, said formatter unit being connected to both of the synchronous and asynchronous buses,
    wherein transfer of the given data between said core unit and said formatter unit is executable through the synchronous bus and through the asynchronous bus.

17. An information processing system according to claim 16 wherein the data transfer by the synchronous bus between said core unit and said formatter unit is determined by communication through the asynchronous bus between said core unit and said formatter unit.

18. An information processing system according to claim 16 wherein said core unit is a controller for controlling the formatter unit.

19. An information processing system comprising:
    a core unit having a synchronous bus and an asynchronous bus, said core unit comprising selecting means for selecting one of said buses for transferring given data; and
    an image memory unit controlled by said core unit, said image memory unit being connected to both of the synchronous and asynchronous buses,
    wherein transfer of the given data between said core unit and said image memory unit is executable through the synchronous bus and through the asynchronous bus.

20. An information processing system according to claim 19 wherein the data transfer by the synchronous bus between said core unit and said image memory unit is determined by communication through the asynchronous bus between said core unit and said image memory unit.

21. An information processing system according to claim 19 wherein said core unit is a controller for controlling the image memory unit.

22. A method for transferring data in an information processing system having a main unit with a synchronous bus, an asynchronous bus and a selecting unit for selecting one of said buses and a plurality of sub-units comprising the steps of:
    connecting each of the sub-units to the main unit through both of the synchronous and asynchronous buses; and
    selecting one of said buses for transferring given data,
    wherein transfer of the given data between the main unit and each of the sub-units is executable through the synchronous bus and through the asynchronous bus.

23. A method according to claim 22, wherein the main unit is connected to at least first and second sub-units and wherein the data transfer by the synchronous bus between the first sub-unit and the main unit and the data transfer by the asynchronous bus between the second sub-unit and the main unit are executed independently.

24. A method according to claim 22, wherein data transfers from the main unit to one of said plurality of sub-units is executed in parallel to other of the plurality of sub-units when the main unit is connected to the one sub-unit by the synchronous bus.

25. A method according to claim 22, wherein the data transfer by the synchronous bus between the main unit and one of the plurality of subunits is determined by communication through the asynchronous bus between the main unit and the one sub-unit.

26. A method according to claim 22, wherein the sub-unit is one of a facsimile communication unit, a file unit, a computer interface unit, a formatter and an image memory.

27. A method according to claim 26, wherein the main unit is a controller controlling the one of the facsimile communication unit, the file unit, the computer interface unit, the formatter and the image memory unit.

28. A method for transferring data in an information processing system having a core unit with a synchronous bus, an asynchronous bus and a selecting unit for selecting one of the buses and a facsimile unit, comprising the steps of:

connecting the facsimile unit to the core unit through both of the synchronous and asynchronous buses; and selecting one of said buses for transferring given data, wherein transfer of the given data between the core unit and the facsimile unit is executable through the synchronous bus and through the asynchronous bus.

29. A method according to claim 28, wherein the data transfer by the synchronous bus between the main unit and the facsimile unit is determined by communication through the asynchronous bus between the core unit and the facsimile unit.

30. A method according to claim 28, wherein the core unit is a controller controlling the facsimile unit.

31. A method for transferring data in an information processing system having a core unit with a synchronous bus, an asynchronous bus and a selecting unit for selecting one of said buses and a file unit, comprising the steps of:

connecting the file unit to the core unit through both of the synchronous and asynchronous buses; and selecting one of said buses for transferring given data, wherein transfer of the given data between the core unit and the file unit is executable through the synchronous bus and through the asynchronous bus.

32. A method according to claim 31, wherein the data transfer by the synchronous bus between the core unit and the file unit is determined by communication through the asynchronous bus between the core unit and the file unit.

33. A method according to claim 31, wherein the core unit is a controller controlling the file unit.

34. A method for transferring data in an information processing system having a core unit with a synchronous bus an asynchronous bus and a selecting unit for selecting one of said buses and a computer interface unit comprising the steps of:

connecting the computer interface unit to the core unit through both of the synchronous and asynchronous buses; and selecting one of said buses for transferring given data, wherein transfer of the given data between the core unit and the computer interface unit is executable through the synchronous bus and through the asynchronous bus.

35. A method according to claim 34, wherein the data transfer by the synchronous bus between the core unit and the computer interface unit is determined by communication through the asynchronous bus between the core unit and the computer interface unit.

36. A method according to claim 34, wherein said core unit is a controller controlling the computer interface unit.

37. A method for transferring data in an information processing system having a core unit with a synchronous bus, an asynchronous bus and a selecting unit for selecting one of said buses and a formatter unit comprising the steps of:

connecting the formatter unit to the core unit through both of the synchronous and asynchronous buses; and selecting one of said buses for transferring given data, wherein transfer of the given data between the core unit and the formatter unit is executable through the synchronous bus and through the asynchronous bus.

38. A method according to claim 37, wherein the data transfer by the synchronous bus between the core unit and the formatter unit is determined by communication through the asynchronous bus between the core unit and the formatter unit.

39. A method according to claim 37, wherein the core unit is a controller controlling the formatter unit.

40. A method for transferring data in an information processing system having a core unit with a synchronous bus, an asynchronous bus and a selecting unit for selecting one of said buses and an image memory unit comprising the steps of:

connecting the image memory unit to the core unit through both of the synchronous and asynchronous buses; and selecting one of said buses for transferring given data, wherein transfer of the given data between the core unit and the image memory unit is executable through the synchronous bus and through the asynchronous bus.

41. A method according to claim 40, wherein the data transfer by the synchronous bus between the core unit and the image memory unit is determined by communication through the asynchronous bus between the core unit and the image memory unit.

42. An information processing system according to claim 40 wherein said core unit is a controller controlling the image memory unit.

* * * * *

UNITED STATES PATENT AND TRADEMARK OFFICE
CERTIFICATE OF CORRECTION

PATENT NO. : 5,867,638

DATED : February 2, 1999

INVENTOR(S) : MASANORI SAKAI ET AL.

It is certified that error appears in the above-identified patent and that said Letters Patent is hereby corrected as shown below:

[57] ABSTRACT

Line 3, "formater" should read --formatter--.

SHEET 1

Figure 1, "FORMATER" should read --FORMATTER--.

SHEET 3

Figure 3, "TRIMING" should read --TRIMMING--.

SHEET 4

Figure 4, "FORMATER" should read --FORMATTER--.

COLUMN 1

Line 59, "formater" should read --formatter--.

UNITED STATES PATENT AND TRADEMARK OFFICE
CERTIFICATE OF CORRECTION

PATENT NO. : 5,867,638

DATED : February 2, 1999

INVENTOR(S) : MASANORI SAKAI ET AL.

It is certified that error appears in the above-identified patent and that said Letters Patent is hereby corrected as shown below:

COLUMN 2

Line 19, "formater" should read --formatter--.
   Line 43, "FIG. 3," should read --FIG. 2,--.

COLUMN 3

Line 3, "signals:" should read --signal:--.

COLUMN 4

Line 2, "unit." should read --unit--.
   Line 58, "formater" should read --formatter--.
   Line 64, "formater" should read --formatter--.

COLUMN 5

Line 15, "formater" should read --formatter--.
   Line 19, "formater" should read --formatter--.
   Line 25, "formater" should read --formatter--.
   Line 34, "formater" should read --formatter--.

UNITED STATES PATENT AND TRADEMARK OFFICE
CERTIFICATE OF CORRECTION

PATENT NO. : 5,867,638

DATED : February 2, 1999

INVENTOR(S) : MASANORI SAKAI ET AL.

It is certified that error appears in the above-identified patent and that said Letters Patent is hereby corrected as shown below:

<u>COLUMN 6</u>

Line 1, "formater" should read --formatter--.

<u>COLUMN 8</u>

Line 7, "and" should read --are--.
Line 47, "formater" should read --formatter--.
Line 49, "formater" should read --formatter--.
Line 54, "formater" should read --formatter--.
Line 55, "formater" (both occurrences) should read --formatter--.
Line 58, "formater" should read --formatter--.
Line 60, "formater" should read --formatter--.
Line 63, "formater" should read --formatter--.

<u>COLUMN 11</u>

Line 45, "supplied" should read --supplies--.

UNITED STATES PATENT AND TRADEMARK OFFICE
CERTIFICATE OF CORRECTION

PATENT NO. : 5,867,638

DATED : February 2, 1999

INVENTOR(S) : MASANORI SAKAI ET AL.

It is certified that error appears in the above-identified patent and that said Letters Patent is hereby corrected as shown below:

COLUMN 12

Line 33, "store" should read --stores--.
    Line 52, "store" should read --stores--.

COLUMN 13

Line 19, "store" should read --stores--.
    Line 53, "devise" should read --device--.

COLUMN 14

Line 23, "formater" should read --formatter--.
    Line 24, "formater" should read --formatter--.
    Line 28, "formater" should read --formatter--.
    Line 31, "formater" should read --formatter--.
    Line 34, "formater" should read --formatter--.
    Line 61, "timing." should read --timing--.
    Line 63, "formater" should read --formatter--.

UNITED STATES PATENT AND TRADEMARK OFFICE
CERTIFICATE OF CORRECTION

PATENT NO. : 5,867,638

DATED : February 2, 1999

INVENTOR(S) : MASANORI SAKAI ET AL.

It is certified that error appears in the above-identified patent and that said Letters Patent is hereby corrected as shown below:

COLUMN 15

Line 27, "to 7" should read --to--.
    Line 30, "generates" should read --generate--.

COLUMN 16

Line 31, "also" should read --also be--.

COLUMN 19

Line 41, "bus" should read --bus,--.

Signed and Sealed this

Seventh Day of December, 1999

Attest:

Q. TODD DICKINSON

*Attesting Officer*   *Acting Commissioner of Patents and Trademarks*